July 7, 1953 M. T. REYNOLDS 2,644,924

FREQUENCY MODULATION SYSTEM

Filed Sept. 3, 1949

Inventor:
Merl T. Reynolds,
by Paul A. Frank
His Attorney.

Patented July 7, 1953

2,644,924

UNITED STATES PATENT OFFICE 2,644,924

FREQUENCY MODULATION SYSTEM

Merl T. Reynolds, Ballston Lake, N. Y., assignor to General Electric Company, a corporation of New York Application September 3, 1949, Serial No. 114,000

2 Claims. (Cl. 332—27)

My invention relates to oscillator circuits of the type employing electron discharge devices, and it has for one of its objects the provision of a new and improved oscillator circuit.

An additional object is to provide an oscillator which will generate stable sinusoidal waves with low distortion over a wide range of frequencies.

Another object of my invention is to provide an oscillator from which output signals of high intensity are obtainable without direct connection to its frequency determining tuned circuit.

A further object is to provide an oscillator in which the tuned circuit inductance is of the two-terminal type having no tapped connection.

It is a still further object to provide an oscillator which will become inoperative upon disconnection of the inductance included in the tuned circuit.

A further specific object of my invention is to provide an oscillator which employs a new and improved easily adjustable circuit for obtaining feedback voltage.

It is also an object of my invention to provide an oscillator circuit which fulfills the above objects and in addition can be made to generate frequency modulated waves in accordance with an applied amplitude modulated signal.

In fulfillment of this latter object, it is a further specific object of my invention to provide an oscillator for generating frequency modulated waves having a low percentage amplitude modulation and a frequency deviation proportional to the amplitude of the modulating signal.

In general, my invention comprises a first electron discharge device having a resonant circuit connected across its input circuit and having a direct output connection to a screening electrode of a second multi-electrode electron discharge device. The output voltage produced by this second electron discharge device is coupled back to the resonant circuit and is of a phase and magnitude to compensate for circuit losses and thereby to sustain oscillations.

In order to produce a frequency modulated output voltage from this oscillator, it is necessary only to introduce an amplitude modulated signal to an emission controlling electrode of the second electron discharge device.

Figure 1:
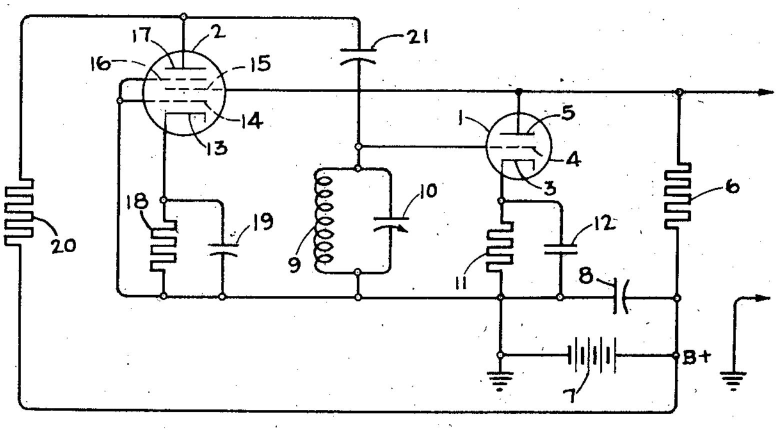
Figure 2:
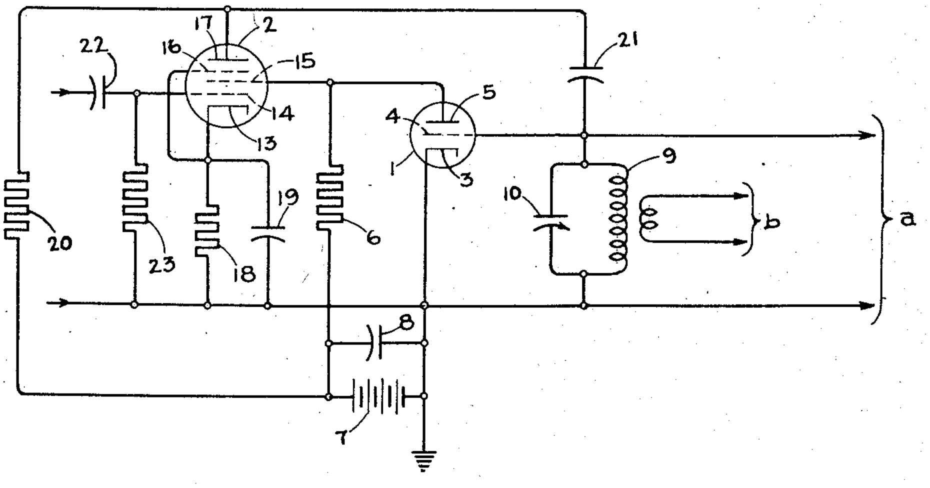

The novel features which I believe to be characteristic of my invention are set forth with particularity in the appended claims. My invention itself, however, together with further objects and advantages thereof may best be understood by reference to the accompanying drawing in which Fig. 1 is a circuit diagram of an oscillator in accordance with my invention, and Fig. 2 is a circuit diagram of an oscillator similar to Fig. 1, but adapted to produce a frequency modulated output in accordance with the amplitude of a modulating input signal.

In the drawings similar elements are designated by the same reference number. Referring to Fig. 1, I have shown one embodiment of my improved oscillator circuit as applied to a three-element electron discharge device 1 cooperating with a five-element electron discharge device 2. The triode discharge device 1 comprises a cathode 3, an emission controlling electrode such as a control electrode 4 and an anode 5 connected through an impedance element such as a load resistor 6 to a source of positive B+ potential such as battery 7 whose negative terminal is grounded. A capacitor 8 of high capacitance is connected from B+ to ground and provides a low impedance path across the potential source for alternating currents at the desired operating frequencies. A frequency determining resonant circuit comprising an inductance 9 connected in parallel with a capacitor 10, preferably of variable capacitance, is connected between control electrode 4 and ground. A biasing means, such as a resistance 11 and a capacitor 12, connected in parallel from the cathode 3 to ground, is preferably also included to adjust the operating point of the discharge device 1 to produce relatively undistorted sinusoidal oscillations.

The pentode discharge device 2, through which feedback oscillatory energy is obtained, includes a cathode 13, an emission controlling first electrode shown as control grid 14, a second control electrode such as screen grid 15, a secondary emission suppressing electrode such as suppressor grid 16 and an anode 17. Both the control grid 14 and the suppressor grid 16 are grounded. Biasing voltage, to determine the operating point of the discharge device 2, is preferably obtained by a cathode resistor 18 connected in the anode-cathode circuit between the cathode 13 and ground. Resistor 18 is by-passed by a capacitor 19 which presents a low impedance path to alternating currents of the desired operating frequency to keep the cathode 13 at a constant potential above ground. The anode 17 is connected through an impedance element such as a load resistor 20 to the positive B+ terminal of battery 7.

The current flow through pentode discharge device 2 is controlled by the anode voltage of triode device 1 by virtue of a direct connection from the anode 5 of device 1 to the screening electrode 15 of device 2. The output voltage of device 2, generated across load resistor 20, is fed back from the anode 17 to the resonant circuit 9, 10 through a coupling capacitor 21. The output sinusoidal voltage of the oscillator is preferably taken between the anode connected end of the load resistor 6 of triode device 1 and ground.

A modification of my invention is illustrated in Fig. 2, whereby the frequency of the output oscillatory voltage can be modulated in accordance with an input amplitude modulated signal. In this circuit, means, such as a coupling capacitor 22, is provided for supplying an amplitude modulated input voltage to the control electrode 14 of the pentode discharge device 2. An input impedance, such as a direct current return resistance 23, is, of course, also connected from the control electrode 14 to ground. In addition, no cathode bias is used in conjunction with the triode discharge device 1, the cathode 3 being preferably connected directly to ground. The remainder of the circuit, as indicated by the similar reference numerals assigned to similar elements, is identical with the circuit of Fig. 1 with the sole exception that the output voltage of the oscillator is preferably, as shown, taken across the resonant circuit, either directly or by inductive coupling, as indicated by the output terminals designated by the letters "*a*" and "*b*" respectively.

The operation of the oscillator of Fig. 1 can easily be understood by assuming a small increase of voltage in a positive direction with respect to ground on the control electrode 4 of triode discharge device 1. As this voltage increases, the current through discharge device 1 correspondingly increases causing an increasing voltage drop across load resistor 6 and a decreasing voltage with respect to ground at anode 5. This decreasing potential is directly applied to the screen grid 15 of pentode discharge device 2 causing the current in its anode circuit, and consequently the voltage drop across load resistor 20 to decrease correspondingly. The resulting increase in potential between anode 17 and ground is applied through capacitor 21 to the tuned circuit 9, 10 as a feed-back voltage in phase with the potential change in voltage at the control electrode 4 of the triode discharge device 1. The energy thus fed back is sufficient to overcome circuit losses, and oscillations are generated at the resonant frequency of the tank circuit 9, 10.

The resonant frequency is, of course, affected by the inherent capacitance of the circuit elements, particularly by the inter-electrode capacity between control electrode 4 and cathode 3 of electron discharge device 1 and between anode 17 and cathode 13 of discharge device 2. These inter-electrode capacities affect the operating frequency since they are effiectively in parallel wtih capacitor 10. To a smaller extent, the resonant frequency will be affected also by the inherent inductance of the circuit.

The operation of the oscillator circuit of Fig. 2 is similar to the operation of the oscillator of Fig. 1 with the exception that the operating point of the pentode discharge device 2 is varied in accordance with the amplitude of an input signal. The consequent variation in the level of the current flowing through the pentode discharge device 2 causes a corresponding variation in the cathode-to-anode impedance and in the cathode-to-screen electrode impedance of the device 2. It will be appreciated that the cathode-to-anode impedance of device 2 is effectively connected across the resonant circuit 9, 10 through the capacitor 21 while the cathode-to-screen electrode impedance of device 2 is also connected across the resonant circuit 9, 10 through the inter-electrode capacitance existing between anode 5 and control electrode 4 of triode device 1. As a consequence, the internal impedance variations of the discharge device 2 combine vectorially with the impedances presented by the capacitor 21 and the grid-to-anode capacitance of device 1 to reflect a shunting reactance cross the resonant circuit 9, 10, whose magnitude varies accordingly. A frequency deviation of the oscillatory output voltage of the resonant circuit 9, 10 is thereby produced whose magnitude is dependent upon the direct current level within the pentode device 2. Since the cathode-to-anode impedance of the device 2 varies in direct relation with the cathode-to-screen electrode impedance of the device 2, the reactive effect of each shunting circuit associated therewith produces a frequency deviation of the resonant circuit oscillations in the same direction. I have found however, that the reactance reflected by the shunting circuit comprising cathode-to-screen electrode impedance and the inter-electrode capacitance of device 1 has greater effect than the reactance reflected by the shunting circuit comprising the cathode-to-anode impedance and the capacitor 21.

The frequency deviation thus produced in the resonating circuit is, therefore, substantially proportional to the amplitude of a signal voltage applied to the control electrode 14 of the pentode device 2. Furthermore, it is apparent that although the amplitude of feedback voltage may be varied considerably by a relatively large signal applied to the control grid 14 of pentode discharge device 2, this causes little effect upon the amplitude of the oscillations developed by the tank circuit since the unbiased triode discharge device 1 operates close to current saturation, and only a relatively small feedback voltage is necessary to drive it to its saturation point. It will also be appreciated that in the frequency modulated oscillator illustrated in Fig. 2, the pentode device 2 functions both as a voltage inverting and amplifying means connected to supply the regenerative feedback voltage of the oscillator and as a reactance modulating device to alter the frequency of the oscillator in accordance with the amplitude of an input signal voltage. This combination of functions in one electron discharge device both simplifies the construction of the circuit and enables the use of a two terminal resonant circuit in a frequency modulated oscillator.

Both the basic oscillator circuit of Fig. 1 and the frequency modulated oscillator circuit of Fig. 2 are of simple construction and are composed of commercially available components whose values are not critical. They produce strong sinusoidal waves over a wide frequency range since the feedback voltage is considerably amplified before it is applied to the resonant circuit.

An oscillator in accordance with Fig. 1 of my invention has desirable frequency stability relatively unaffected by changes in load or supply voltage since its output can be taken without loading the resonant circuit directly. The grounded connection for the resonant circuit also permits frequency adjustment during operation without the danger of receiving an electrical shock.

In addition, the lack of the necessity for taps on the inductance in the resonant circuit and the fact that the oscillator becomes inoperative if there is no inductive element in the resonant circuit makes this oscillator particularly adapted for use in determining values of inductance or capacitance of elements that may be inserted therein.

If, for example, the value of the inductance of element 9 is unknown, but the capacitance of element 10 is calibrated, the frequency of the oscillator may be adjusted until its coincides with the frequency of an external standard oscillator, and the inductance of element 9 can be readily calculated. Other inductances can be substituted easily since no tapped connection to the inductance is necessary.

Although I have shown these circuits as applied to a triode discharge device in conjunction with a pentode discharge device, either a single multi-purpose device or various combinations of other types of electron discharge devices can obviously be used instead. It is to be further understood that while I have shown only certain preferred embodiments of my invention, I do not wish to be limited thereto since many modifications may be made, and I, therefore, intend in the appended claims to cover all such modifications as fall within the true spirit and scope of my invention.

What I claim as new and desire to secure by Letters Patent of the United States is:

1. An oscillator comprising a first electron discharge device having a cathode. a control electrode and an anode, a resonant circuit connected in the control electrode-to-cathode circuit of said device, an impedance element connected in the anode-to-cathode circuit of said device to produce a voltage across said impedance element which varies inversely with a voltage at said control electrode, a second electron discharge device having at least a cathode, a control electrode, a screen electrode and an anode, said screen electrode being directly connected to receive the voltage developed across said impedance element, impedance means connected in the anode-to-cathode circuit of said second discharge device for producing an amplified voltage output from said second discharge device which varies inversely with the voltage supplied to said screen electrode, coupling means for delivering said amplified voltage output of said second discharge device to said control electrode of said first discharge device to produce an oscillatory voltage across said resonant circuit, and input signal connecting means to supply a signal voltage between said control electrode and said cathode of said second discharge device to vary the frequency of said oscillatory voltage in response to amplitude modulations of said signal voltage.

2. An oscillator circuit comprising a first electron discharge device having a cathode, a control electrode and an anode, a source of uni-directional potential having a positive terminal and a negative terminal, said cathode and said negative terminal being connected to a common point, a parallel tuned circuit connected between said control electrode and said common point, a first impedance element connected between said anode and said positive terminal, a second electron discharge device having a cathode, a control electrode, a screening electrode and an anode, said screening electrode being directly connected to the anode of said first electron discharge device, means for biasing said last-mentioned control electrode at a constant potential negative with respect to its associated cathode, electrically conducting means connected to provide a path for direct current flow from said last-mentioned cathode to said common point, a second impedance element connected between the anode of said second electron discharge device and said positive terminal, a capacitive coupling from said last-mentioned anode to said tuned circuit to sustain oscillations in said resonant circuit, and input signal coupling means to supply a signal voltage between said control electrode of said second discharge device and said common point to vary the frequency of said oscillations in response to amplitude modulations of said signal voltage.

MERL T. REYNOLDS.

References Cited in the file of this patent

UNITED STATES PATENTS

| Number | Name | Date |
|---|---|---|
| 2,269,417 | Crosby | Jan. 6, 1943 |
| 2,321,269 | Artzt | June 8, 1943 |
| 2,361,658 | Sinnett | Oct. 31, 1944 |
| 2,394,018 | Shank et al. | Feb. 5, 1946 |
| 2,416,513 | Brown | Feb. 25, 1947 |
| 2,426,295 | Born | Aug. 26, 1947 |
| 2,447,248 | Harris | Aug. 17, 1948 |
| 2,509,280 | Sziklai et al. | May 30, 1950 |
| 2,553,165 | Bliss | May 15, 1951 |